United States Patent [19]
Korn et al.

[11] 3,778,938
[45] Dec. 18, 1973

[54] METHOD FOR DECONTAMINATION OF SURFACES OF NUCLEAR REACTOR COMPONENTS

[75] Inventors: Roland Korn, Nurnberg; Günther Seyd; Uwe Paulsen, both of Erlangen, all of Germany

[73] Assignee: Siemens Aktiengesellschaft, Berlin and Munich, Germany

[22] Filed: Feb. 4, 1972

[21] Appl. No.: 223,471

[30] Foreign Application Priority Data
Feb. 17, 1971   Germany................... P 21 07 479.3

[52] U.S. Cl. ............................................... 51/320
[51] Int. Cl. ............................................. B24c 1/00
[58] Field of Search .........................51/319–321

[56] References Cited
UNITED STATES PATENTS

| 2,892,771 | 6/1950 | Milliken | 51/320 UX |
| 2,665,118 | 1/1954 | Broman | 51/320 X |
| 2,948,092 | 8/1960 | Fuller | 51/320 X |

*Primary Examiner*—Donald G. Kelly
*Attorney*—Arthur E. Wilfond et al.

[57] ABSTRACT

Cleaning of radioactively cotaminated surfaces and components of nuclear power reactors is carried through by means of sandblasting technique, wherein boron trioxide sand is used as the blasting medium. The process is carried out such that the passivation layer on the surfaces to be cleaned is not attacked and that water is used for flushing out the blasting materials which may have remained on the surfces which have been cleaned.

6 Claims, 1 Drawing Figure

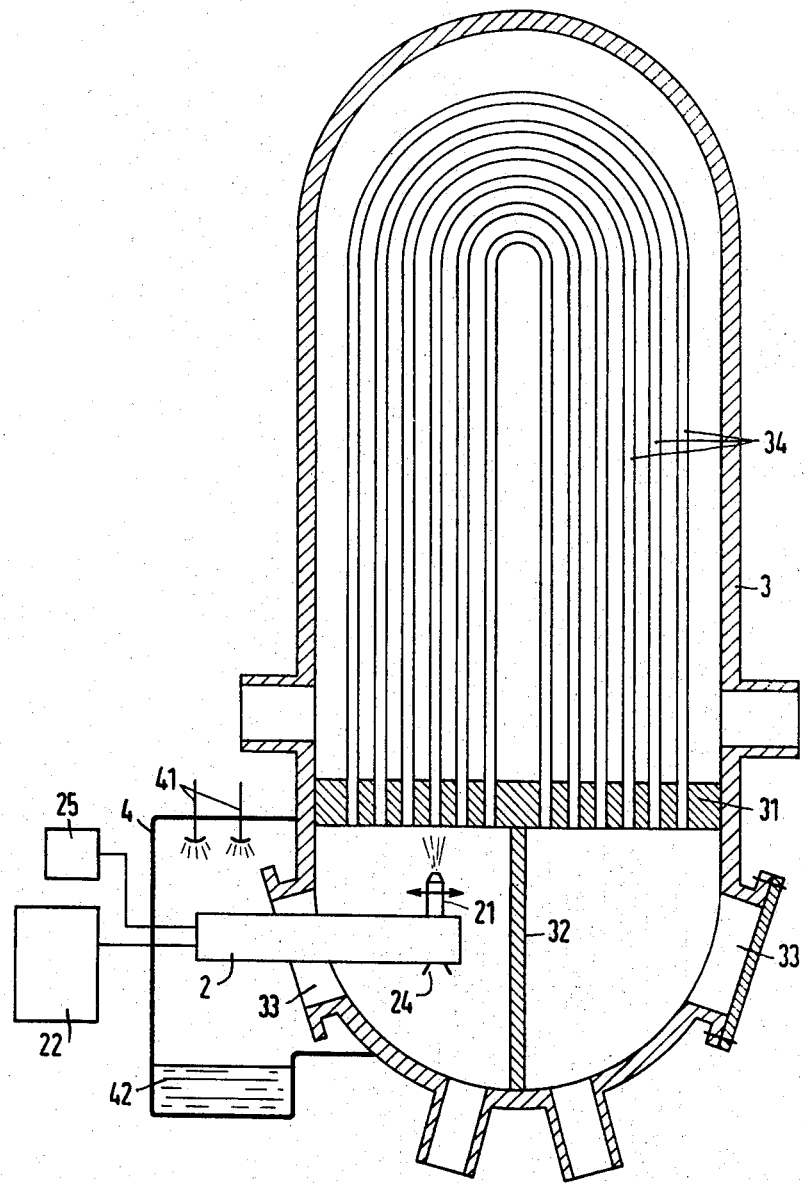

METHOD FOR DECONTAMINATION OF SURFACES OF NUCLEAR REACTOR COMPONENTS

The invention relates to a method for cleaning of components of nuclear reactor power plants which have been wetted during the operation with $H_2O$ or, as the case may be, with $D_2O$, particularly for the decontamination of radioactively contaminated regions. The primary circulation apparatus of water-cooled nuclear reactors, and also those that are cooled with heavy water, outside of the actual reactor container proper, are composed of pipe conduits, steam generators, condensers, pumps and similar installations, which are normally made of steel. It is unavoidable that, in such a plant, in the course of time, a sediment is deposited on the inner walls of these components, which may be composed of radioactive and inactive corrosion products of the component materials, as well as of radioactive fission products derived from defective fuel elements. The radioactivity of these layers may, in the course of time, become so large that, whenever repairs become necessary, work in their vicinity is only possible over a short period or not at all, due to radiation. Thus, normally a longer operating interruption of the nuclear reactor must be provided for, until the radioactivity of the components which are to be repaired, for instance a pump or a steam generator, has decayed to such an extent that endangerment of the working personnel is no longer present.

Such long periods of interruption, however, are completely intolerable for the economic operation of a nuclear power plant. The usual decontamination techniques with the aid of acids and pickles, however, are impossible in connection with fixedly built-in power plant components, since the possible transport of such treatment media into other portions of the plant may lead to further inestimable damage. The task arose, therefore, with conscious departure from such known methods and techniques, to find a decontamination method which may be put in operation, immediately following the shut-down of the power plant, and thereby permitting the carrying through of the necessary repairs, as well as the start-up of the plant in the shortest possible time. It also becomes necessary to avoid with absolute certainty any injurious effects of such methods on other nuclear reactor components. The method further called also for such a safety factor that, in the case of any faulty operation, absolute certainty was provided that damage to the base material and to the surfaces of the components to be cleaned, could not take place.

These conditions, as proposed by the invention, are attained, in that, according to the principle of the sand-blast technique, borontrioxide particles with the aid of a compressed jet are used for the mechanical working off of the surfaces to be cleaned down to the passivation layer of the base material, and that the remainder of the jet blast material is dissolved and then removed by water flush. Accordingly, this proposal represents a modified sand blasting technique wherein, instead of the quartz with a Mohs hardness of seven, borontrioxide ($B_2O_3$) is used with a Mohs hardness of five to six. This material, accordingly, is considerably softer than quartz, and its hardness is of the order of magnitude corresponding to that of the deposits on the components which are to be removed, which essentially are comprised of coherent layers of magnetite-like character. Thus, the first oxidation layer on the base material, due to the absence of other foreign matter deposits, is substantially harder than the overlying layers. This basic layer has the task to protect the base material from further corrosion, and is defined herewith also as a passivation layer. Injury to this layer due to decontamination would therefore expose the base material to a further corrosion attack, which, if possible, should be prevented. since, in accordance with the inventive process, the jet blast material used, that is, borontrioxide, is somewhat softer than this passivation layer, this process thus does not result in any further attack thereon. Independent of the period of treatment and the speed of the borontrioxide particles, this passivation layer therefore remains preserved so that an inherent safety is contained in this treatment process. The borontrioxide, furthermore, has the great advantage that it is easily water-soluble, so that, by means of flushing, it may be recovered comparatively easily from the cleaned components. Should, however, after the flushing process or after the subsequent repairs, borontrioxide particles still remain in the installation, this does not represent, however, any disadvantage, since these particles may be dissolved through the reactor cooling media, whereby they are converted into boric acid. Just, boric acid, however, is used in water-cooled nuclear reactors as dissolved neutron poison in the cooling water for compensation of the surplus reactivity, so that boric acid components, additionally derived from the cleaning process, may be further used through the boric acid control system of the reactor, without difficulty.

Although the borontrioxide sand, which comes in various grain sizes, may be considered hygroscopic, the life, however, of containers with this blasting material, which have been opened, will definitely last through several days without precautions. For the purpose of handling this material, therefore, no special hygroscopic protection is necessary, so that the carrying out of the process then becomes relatively uncomplicated.

Apart from these advantages, the method in accordance with the invention, vis-a-vis the known acid-pickling processes, has the further great advantage that it may be used with far greater target precision. That is to say, predetermined surface portions, including those of small dimensions of only a few square centimeters, as well as all of the surfaces of nuclear reactor components, may be decontaminated.

The construction and method of operation of the invention, however, together with additional objects and advantages thereof, will be best understood from the following description of specific embodiments when read in connection with the accompanying drawing, in which:

For a further explanation of this process, reference is made to the figure in which an exemplified case has been shown schematically. In the case shown, the cleaning of the pipe sheet of a steam generator in a nuclear power plant has been exemplified. This cleaning is necessary since, for instance, one or more heat exchanger pipes 34 have become leaky. It is therefore necessary to lock them into a pipe sheet 31, which, however, is only possible after a decontamination of its surface. The blast arrangement 2 is accordingly introduced through a manhole 33 of a chamber of the boiler 3. The jet nozzle 21 is here led back and forth in accordance with a coordinate guiding system along the surface of the pipe sheet 31, the compressed gas being supplied in a known manner, for instance, from a compressor 22. The storage container for the boron trioxide sand is, for the purposes of clarity, not further illustrated. The grain size of the blast material, for example, may comprise 150 $\mu$, and the gas pressure 6 atmospheres. Within 1 minute, approximately 500 g are blasted out and thereby a surface of about 100 to 200 cm$^2$ will have been cleaned. The removal of the main body of the blasted boron trioxide takes place through suction and filling into barrels, appropriate filters being provided for the protection of the surroundings. After carrying through the decontamination, water is flushed over the treated surface and thereby remainders of the boron trioxide thereon are dissolved out. In connection therewith, it is of advantage, during the blasting process, to protect the adjacent surroundings of the heat exchangers to be treated, from the boron trioxide dust, and also against radioactive impurities contained therein. This may be obtained by means of screening 4, for instance of plastic foil, it of course being understood that the compressed air introduced into the steam generator will again have to be removed through an exhaust aperture 24. The compressed air is then exhausted into the opening through a filter 25, which retains the entrained boron trioxide particles. It may be further advantageous to effect, within this working space, by means of fogging nozzle 41, a strong humidification of the room atmosphere and to thereby precipitate the boron trioxide dust particles, as well as particles of the abraded layers and to collect them in a container 42.

When such a decontamination has been carried out manually, that is, when the operating personnel is present within the range of the boron trioxide dust, it is appropriate to wear a protective respirator mask, as well as appropriate protective goggles for the eyes, so as to prevent boric acid injury thereto. These, however, are utensils which are also required to be used during normal sand blasting operations.

Normally, for the blast installation, the use of a nozzle is sufficient, such as is known from sandblasting technology. If, however, especially small surfaces are to be decontaminated, as specific targets, for instance, unfavorably situated surface forms have to be reached, it is appropriately useful to throw the blasting material on to the respective surfaces with the smallest possible scatter, as by a nearly parallel jet. This may be attained through the use of the Laval-like formation of the blast nozzle, as well as by a correspondingly suitable grain size of the blasting material. Through such a nozzle form, it also becomes possible to increase the velocity of the blasting material, which is the same as an increase of the effectiveness thereof, without, however, attacking the passivation layer of the base material.

It is of course understood that, in the example here illustrated, after the decontamination of the one chamber, the other chamber, which is separated therefrom through a partition 32, is treated through a second manhole 33. After carrying out the flushing steps mentioned above, the chambers may be entered and the work of sealing the defective pipes 34 may then take place. After a concluding pressure test of the steam generator thus repaired, the generator may again be connected to the reactor circulatory system, so that the time periods for the repair work practically become the equivalent of the at-rest periods of the power plant. Waiting for the decay of the radioactivity, therefore, becomes unnecessary.

Obviously, similar working operations may be applied to other reactor components, such as pipe conduits, pumps, etc. This method, of course, is also suitable for the normal cleaning operations on non-contaminated surfaces, and is therefore not limited to components of nuclear reactor installations. In conclusion, the special advantages of this process may be summed up as follows:

1. Inherent safety during the removal of the depositions since the passivation layer of the base material will not be attacked.
2. Water solubility of the blasting material, so that the removal thereof from the reactor circulatory installation or from other components does not pose any difficulties. An injury of packing, bearings and the like, as is unavoidable with sand blasting, is avoided with certainty.
3. Harmlessness of the boric acid, which is produced through the dissolution of boron trioxide in the water, which already contains similar matter as trimming material for the compensation of the surplus reactivity. But even when, normally, boric acid is not used in the reactor operation, the removal thereof from the cooling water, for instance by means of ion exchanger, does not pose any difficulties.

Although the invention is illustrated and described herein as a method for decontamination of surfaces of uclear reactor components, it is nevertheless not intended to be limited to the details shown, since various modifications and structural changes may be made therein without departing from the spirit of the invention and within the scope and range of equivalents of the claims.

It is claimed:

1. Process for cleaning of components of nuclear reactor power plants which have been wetted during the operation with $H_2O$ or $D_2O$, particularly for the decontamination of radioactively contaminated regions, comprising the step, in accordance with the principle of sandblasting techniques, of mechanically abrading the surfaces to be cleaned down to the passivation layer of the base material by means of boron trioxide particles with the aid of compressed gas jets.

2. Process in accordance with claim 1, including the step of rendering the jet of the boron trioxide particles nearly parallel.

3. Process in accordance with claim 1, including the step of treating the surfaces to be cleaned by applying the blasting jet in accordance with a coordinate system.

4. Process in accordance with claim 3, including the step of remotely controlling the application of said jet.

5. Process in accordance with claim 1, including the step of applying a water flush for dissolving any remaining blasting material from the reactor installation and removing the dissolved blasting material together with the water flush.

6. The process according to claim 1, further including the steps of closing off the working space including the region to be cleaned from the surroundings, filtering and exhausting the compressed air used for the blasting jets, and humidifying the atmosphere of the working space for precipitating the blasting medium dust and impurities entrained thereby.

* * * * *